Dec. 28, 1937.                G. WILMANNS                2,103,961
EXPOSURE FRAME FOR RÖNTGEN FILM
Filed March 28, 1935
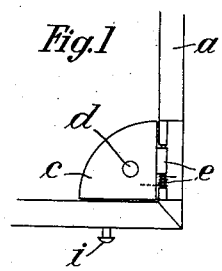
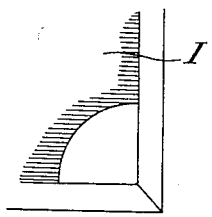
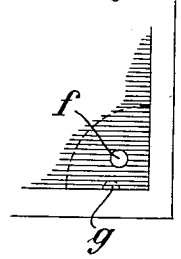
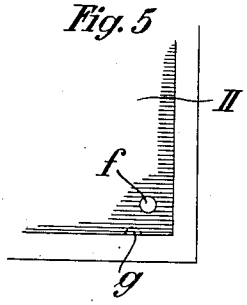
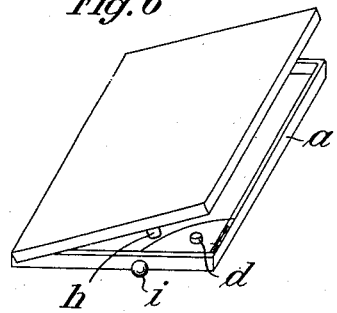
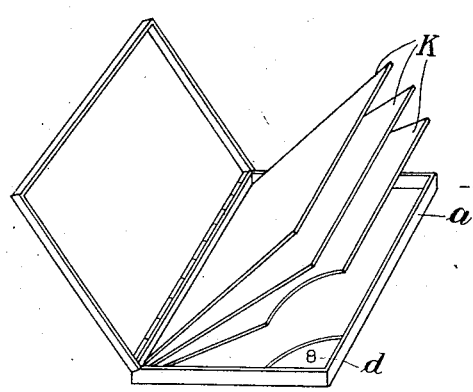
Inventor:
Gustav Wilmanns,
By Attorneys
Potter, Pierce & Scheffler Patented Dec. 28, 1937

2,103,961

UNITED STATES PATENT OFFICE 2,103,961

EXPOSURE FRAME FOR RÖNTGEN FILM

Gustav Wilmanns, Wolfen Kreis Bitterfeld, Germany, assignor to I. G. Farbenindustrie Aktiengesellschaft, Frankfort-on-the-Main, Germany Application March 28, 1935, Serial No. 13,511
In Germany March 31, 1934

3 Claims. (Cl. 250—34)

My present invention relates to an exposure frame for Röntgen film.

One of its objects is an improved exposure frame for Röntgen film. Another object is an exposure frame for Röntgen film which is provided with means so that only a package of film and fluorescent sheets can be inserted in which the film and fluorescent screen are adapted to each other. Further objects will be seen from the detailed specification following hereafter, reference being made to the accompanying drawing in which:

Fig. 1 shows a part of a cassette provided with means preventing the insertion of a sheet other than that required, Fig. 2 shows a detailed view of that part in Fig 1 which prevents the insertion of a sheet other than that required, Fig. 3 shows the part of the cassette represented in Fig. 1 and a fluorescent sheet inserted in the cassette which sheet has a cut out corresponding with the outline of the part c in Fig. 1, Fig. 4 shows the part of the cassette represented in Figs. 1 and 3 with a film inserted on the fluorescent sheet having an opening f corresponding with the diameter of the pin d of Fig. 1, and having a finger notch, Fig. 5 shows the part of the cassette represented in Figs. 1, 3 and 4 with a second fluorescent screen inserted on the film, Fig. 6 shows a fluorescent view of a cassette according to this invention with a pin adapted to engage finger notches in the film and fluorescent sheets, Fig. 7 shows another means for preventing the insertion of a sheet other than that required into a cassette, and Fig. 8 shows the cassette and the position of the fluorescent sheets ($k$).

It has been proposed to use Röntgen films colorsensitized with a dyestuff. These films require special treatment, involve the use of particular fluorescent sheets and relatively short exposure to light; moreover, the illumination of the dark room must be different from that which is used in the development of Röntgen films which are not color-sensitized.

By the present invention errors and faults are avoided in that each film can be used only in a certain exposure frame (cassette) together with the fluorescent sheets which correspond with the properties of the film. It is thus avoided that a film might be exposed between fluorescent sheets or packs of such sheets which are not adapted for use with it. The invention involves a further advantage, namely that it can be detected in the developed Röntgen film firstly how the film was orientated during the exposure, and further whether and how the film was sensitized on one or both sides and what fluorescent sheets had been used during its exposure. It is even possible to draw conclusions from the position and the form of the identification marks as to the kind of material of the film; for example a mark may be applied to the film indicating whether it is an inflammable or safety film. These marks may be of different kinds. It is preferred that the characteristic mark should be provided by some mechanical part which prevents the insertion in the cassette of a sheet of unsuitable film. The part of the cassette which prevents the insertion of the unsuitable film may be in one or more of the corners or at an edge of the cassette. The parts are advantageously arranged on fixed or movable flaps or edges which partially cover the film during the exposure. These covering parts may be of any suitable material, for instance of aluminium, aluminium coated with lead or lead itself, accordingly as it is desired that the covering parts should wholly or partially be opaque to Röntgen rays. These partial coverings are particularly of interest when one is using films and sheets of the same or different fluorescence, color-sensitized only on one side, or differently color-sensitized on each side.

Cassettes made according to the invention are illustrated in the accompanying drawing.

In a cassette $a$ (Figs. 1 and 6) there is fixed or mounted on a hinge $e$, preferably a spring hinge, a metal plate $c$, either in one corner of the frame (as shown in Fig. 1) or in several corners or (as shown in Fig. 7) at one side of the cassette. The plate $c$, which serves to cover only a part of the film, carries either (as shown in Fig. 1) one or (as shown in Fig. 7) several pins $d$ (compare Fig. 2). The sheet I to be used in the Röntgen apparatus and advantageously fixed on the bottom of the cassette as indicated in Fig. 3), is cut away correspondingly with the shape of the plate $c$, so that the sheet I forms with the covering plate $c$ a continuous plane from which the pin or pins $d$ project. In the film intended for the sheet I (Fig. 4) there is or are perforations $f$ which engage the pins $d$ so that the film lies flat on the sheet I and on the cover plate $c$. Also sheet II is provided with one or more openings corresponding with the pins in question. The end faces of the pins $d$ either form with the sheet II a plane or engage in the cover. The pins $d$ may have either a circular cross section as shown in the figures, or they may have the form of the so-called Agfa rhombus, or they may have the form of printing types which may serve to indicate the kind of constructional material and the color sensitizing of the film. For indicating the properties of the film there are many possibilities, since the pins may vary in number and/or in cross section or may be placed at different parts of the edge of the cassette.

The pins may also be arranged, as indicated in Fig. 7, in such a manner that the perforations in the film serve as filing perforations for filing the film in a case book after it has been developed. The covering plate c may be under spring action as already indicated (Fig. 1) so that on opening the cassette the film and the sheet II are raised therefrom, thereby facilitating removal of the film. Sheet II may even be made fast to the cover of the cassette.

As a particular characteristic for identifying different films there may be arranged at the edge of the cassette finger notches, as indicated at g in Figs. 4 and 5. These correspond in film and fluorescent sheet so that the removal of the film and the sheet from the cassette is facilitated. If such marginal notches are to be used as characteristics, it is preferable to provide the cover with a pin, such as indicated at h in Fig. 6, which will prevent the cassette from being closed when the film and sheet do not correctly correspond.

The spring plate c may be held in its lowered position by any suitable device, for instance the stop indicated at i in Fig. 6.

What I claim is:

1. An exposure frame for Röntgen film comprising a cassette, a lid for closing said cassette, and pins mounted in said cassette, said pins co-operating with holes in a sheet of the same size as has said cassette, so that the lid of said cassette cannot be closed when inserting therein a sheet of the same size as has the cassette, but having a different arrangement of holes.

2. An exposure frame for Röntgen film comprising a cassette, a lid for closing said cassette a plate hinged to the interior of said cassette for protecting part of the film from exposure, and pins mounted in said cassette, said pins co-operating with holes in a sheet of the same size as has said cassette, so that the lid of said cassette cannot be closed when inserting therein a sheet of the same size as has the cassette, but having a different arrangement of holes.

3. An exposure frame for Röntgen film comprising a cassette, a lid for closing said cassette, a fluorescent sheet arranged in said cassette, a second fluorescent sheet arranged in the lid of said cassette, and pins mounted in said cassette, said pins co-operating with holes in a sheet of the same size as has the cassette so that the lid of said cassette cannot be closed when inserting therein a sheet of the same size as has the cassette, but having a different arrangement of holes.

GUSTAV WILMANNS.